Nov. 29, 1966  G. J. MEYERS  3,288,481
SWIVEL CASTER HAND TRUCK
Filed Aug. 21, 1964
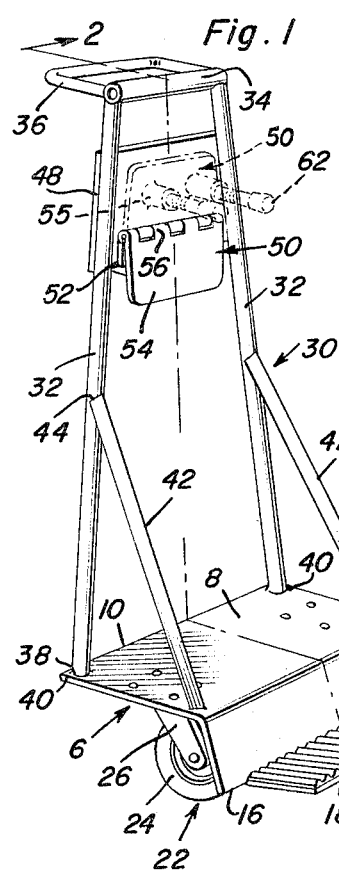
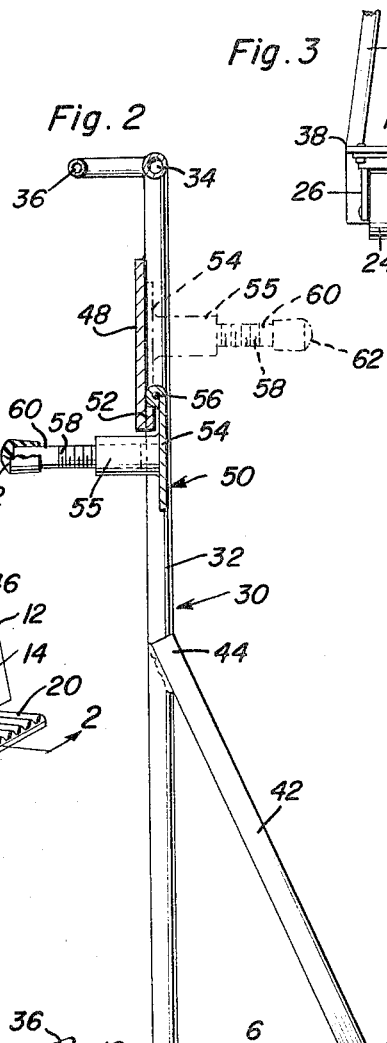
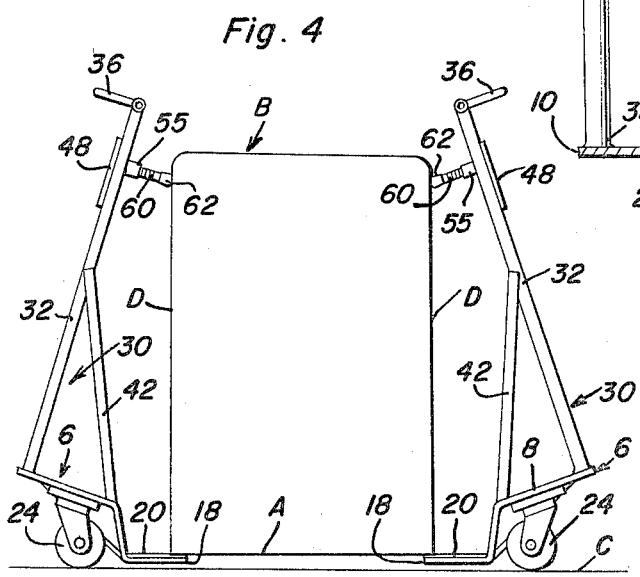
George J. Meyers
INVENTOR.

ns states Patent Office 3,288,481
Patented Nov. 29, 1966

3,288,481
SWIVEL CASTER HAND TRUCK
George J. Meyers, 1557 N. Yellowstone Highway,
Idaho Falls, Idaho
Filed Aug. 21, 1964, Ser. No. 391,110
3 Claims. (Cl. 280—47.27)

This invention relates to a manually maneuverable heavy and cumbersome load lifting, handling and moving dolly which, while feasible and practical for use in diversified fields of work, is expressly designed and uniquely adapted for use by one when laying carpet, linoleum and the like.

Briefly, the dolly herein disclosed is characterized by a simple tiltable truck having a pair of casters or rollers which are swivelly bracketed on the bottom of the platform or base plate. The forward or leading edge of the platform is provided with a first flange constituting a ledge-like step or shelf. The step provides the desired lifting lip which, in practice, is piloted or nosed into place between the load—a refrigerator or kitchen range for example—and is thus interposed between the bottom and underlying floor. The second flange provides a connecting web or apron and joins the step to the platform. Upstanding frame means is carried by the platform and has a handle or grip at the upper end portion. This means is, in turn, provided with novel abutment means which lines up with a vertical side or surface of the load and comes to rest against said surface and props the frame means in a desired inclined self-locating and retained manner.

Wheeled hand trucks in this category of inventions are customarily used in pairs as exemplified, for example, in the Baer hoisting dolly 2,521,819 and Fosbender caster-equipped truck or carrier 2,473,873 to which reference may, if desired, be made.

An object of the instant invention is to structurally, functionally and in other ways improve upon prior art furniture and appliance handling and transporting hand trucks.

One improvement has to do with the mobile truck in that it comprises a one-piece unit having a generally rectangular plate constituting a platform and which is rollable and tiltable on a pair of companion swivelly bracketed casters. The depending flange at the forward or leading marginal edge is inclined forwardly and downwardly in front of, shields the casters and carries the forwardly projecting flange. This latter flange constitutes and provides the desired step or ledge and is disposed at right angles to the 15° depending flange. Accordingly, the truck is not only freely rollable but is fulcrumed and nicely balanced on the horizontal axes of the casters.

Another improvement resides in the upstanding truck handling and levering frame means. This means comprises a pair of frame members or legs having their lower ends affixed to corner portions of the plate or platform contiguous to the rearward or trailing marginal edge. These legs are stabilized with stress and strain equalizing braces anchored atop the forward portion of the platform. A rearwardly projecting yoke or U-shaped hand-grip is joined to the upper ends of the legs and makes for maximum coordinated utilization of the interrelated component parts.

A further and highly significant improvement pertains to the aforementioned abutment means. This innovation is based on the mechanical advantage gained by checking the tilting level of the truck's platform and the orienting of the step so that it assumes a generally level or horizontal plane in use. To the ends desired one or more (preferably a pair) of extensible and retractable studs are adjustable in socket members mounted on one leaf of a double-leaf hinge supported on an adapter plate or panel carried by upper median portions of the legs.

It is within the purview of the concept to cap the end thrust studs with bumper cups and to cover the upper surface of the step with an anti-skid pad.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a dual swivel caster hand truck expressly, but not necessarily, designed and adapted for use by carpet layers.

FIG. 2 is a view on a slightly enlarged scale with parts appearing in section and elevation (also full lines and phantom lines) taken approximately on the plane of the vertical section line 2—2 of FIG. 1 looking in the direction of the arrows.

FIG. 3 is a view on a smaller scale with parts fragmentarily shown and observing the caster-equipped truck in a direction from left to right, FIG. 1 for example.

FIG. 4 is a view on a smaller scale showing how a pair of the trucks are positioned for use in hoisting and moving the liftable load.

By way of introduction to the description of the details it will be understood that these trucks or dollies may be used singly or collectively. For simplification of description a single dolly or truck is being shown in FIGS. 1 to 3, inclusive. This dolly comprises a mobile base or truck which is denoted generally in FIG. 1 by the numeral 6. This unit is characterized by a one-piece sheet metal adaptation which comprises a generally rectangular plate 8 having flat top and bottom surfaces and which is of requisite stability, the rearward or trailing edge thereof being denoted at 10 and the forward or leading edge at 12. The leading edge portion is of stepped construction. More specifically, it comprises a first or depending flange 14 which is of a length commensurate with the length of the platform and which inclines forwardly and downwardly at an approximate 15° angle. The lower edge thereof 16 is provided with an outstanding shorter flange 18 which constitutes a ledge-like shelf or step. The upper surface of this is covered with a suitably corrugated and cushioned anti-skid pad 20. The surface could be milled, knurled or otherwise made.

Referring to FIG. 2 and assuming that the platform is in a horizontal plane, it will be seen that the drop flange or apron 14 slopes forwardly and downwardly and that the step 18, which is in a plane at right angles to the flange 14, slopes forwardly upwardly. Two casters, each denoted by the numeral 22 are provided. Each caster comprises a roller or wheel 24 journaled in bearings provided in the arms of the forwardly pitched yoke 26 which has its upper end swivelly bracketed as at 28 to the underneath median portion of the plate or platform 8. The depth of the apron flange 14 is proportional with the diameter of the rollers or casters 24 whereby the forward peripheral tread portions of the rollers are substantially shielded by the flange 14. Also, with this arrangement the rollable platform as a unit is fulcrumed on the axes or journals of the casters whereby it may assume the position shown for example in FIG. 2 or the inwardly downwardly inclined position suggested in FIG. 4 whereupon the ledge-like step can be interposed between the bottom A of the load B and the floor or equivalent foundation C.

The truck handling and levering means comprises an upstanding frame which is denoted generally by the numeral 30. This frame preferably comprising a pair of duplicate coplanar spaced apart legs 32 whose upper ends converge and are connected together by a rigidifying cross member 34. This cross member is provided on its rearward side with a yoke or a substantially U-shaped member 36 which constitutes a handle or hand-grip. These legs are perpendicular to the plane of the platform and have their extreme lower end portions 38 fixedly joined to the respective corner portions 40 of the rearward edge 10, that is to points contiguous or close to the edge 10. Stabilizing diagonal braces 42 are provided and have their upper ends fixed as at 44 to the median portions of the legs and have their forward lower ends 46 joined to the forward corner portions of the platform, that is adjacent to and slightly rearwardly of the leading edge 12. This frame unit or means 30 provides a handling lever for the truck means 6. The frame means is capable of being toed in and inclined in respect to the vertical cooperating side D of the load B when in use. To obtain the desired prop and self-retaining action abutment means is provided. This means comprises an adapter panel or plate 48 which spans the space between the upper median portions of the legs and is fixedly joined thereto. This plate provides a support for a suitable hinge denoted at 50. The hinge comprises a short leaf 52 which is superimposed on and fixed to the front surface of the panel and further comprises a wider or deeper hinge leaf 54 which is hinged in place at 56. This hinge leaf 54 (see FIG. 2) is provided on one side with a pair of laterally projecting coplanar spaced parallel socket members 55 which are screw-threaded internally to accommodate the threads 58 on a projectable and retractable or adjustable abutment stud 60. The free end of the stud is capped with a rubber cup or the like 62 which provides a protector abutment which comes into play in the manner suggested in FIG. 4. Normally the weight of the abutment means, the hinge leaf 54, socket members and studs causes the assembly to drop down and assume the full line position shown in FIG. 2. When the device is in use the hinge leaf 54 is swung up against the panel 48, that is the face of the panel and abuts the same as shown in phantom lines in FIG. 2. This positions the end thrust abutment studs so that they can function in the manner shown in FIG. 4.

When the trucks are used in pairs as shown in FIG. 4 the limit stops or abutments are braced against the surfaces D and cause the levering frame 30 to assume the inclined or tilted position shown whereupon the paired steps are substantially horizontal beneath the bottom of the load with the platforms inclining inwardly and downwardly toward the surfaces D. With the arrangement shown it is possible for the user to not only lift the load but to move it from place to place in any desired manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A manually maneuverable load lifting, handling and trucking dolly comprising, an upstanding mobile truck including an upstanding frame having a horizontal outstanding step projecting outwardly of one side of the lower portion of said frame and adapted to be nosed into a position between a floor or an equivalent foundation and the bottom of the load which is to be hoisted and moved about, said frame having handle means adjacent its upper end, abutment means carried by said frame adjacent the upper end thereof projecting outwardly of said one side of said frame above said step and adapted to reside and brace itself against a cooperating vertical surface of the load to be moved, said abutment means serving to permit the frame means to tilt toward and engage said surface by said abutment means when said step is in a horizontal plane, the lower end portion of said frame including floor engaging support wheel means disposed behind said step and including lower surface portions projecting only slightly below said step when the latter is horizontally disposed, a mount provided with first and second sides and pivotally supported from said frame adjacent the upper end thereof for movement between a first limit position with said first side facing outwardly of said one side of said frame and a second limit position with said second side facing outwardly of said one side of said frame, said abutment means being adjustably carried by said mount and projecting outwardly of one side of the latter.

2. The combination of claim 1 wherein said mount comprises an upstanding panel member pivotally secured along an edge portion to said frame for movement about a horizontal axis generally paralleling said frame.

3. The combination of claim 2 wherein said abutment means is carried by said panel member for adjustable positioning laterally of the medial plane of said panel member.

References Cited by the Examiner

UNITED STATES PATENTS

| | | | |
|---|---|---|---|
| 953,043 | 3/1910 | Lyons | 280—47.27 |
| 2,008,887 | 7/1935 | Venables | 280—35 |
| 2,473,873 | 6/1949 | Fosbender | 280—35 |
| 2,650,834 | 9/1953 | Coval | 280—47.27 |
| 2,845,278 | 9/1958 | Breeler | 280—47.29 X |
| 3,157,411 | 11/1958 | Rhodes | 280—47.29 |

BENJAMIN HERSH, *Primary Examiner.*

A. HARRY LEVY, *Examiner.*

J. A. PEKAR, *Assistant Examiner.*